(12) United States Patent
Cudich

(10) Patent No.: US 9,009,611 B1
(45) Date of Patent: Apr. 14, 2015

(54) BATCH GRAPHICAL USER INTERFACE GENERATOR

(75) Inventor: Matias Cudich, San Francisco, CA (US)

(73) Assignee: Google Inc., Mountain View, CA (US)

(*) Notice: Subject to any disclaimer, the term of this patent is extended or adjusted under 35 U.S.C. 154(b) by 268 days.

(21) Appl. No.: 13/603,241

(22) Filed: Sep. 4, 2012

(51) Int. Cl.
*G06F 3/00* (2006.01)
*G06F 9/44* (2006.01)

(52) U.S. Cl.
CPC .................................. *G06F 8/34* (2013.01)

(58) Field of Classification Search
CPC ........................................................ G06F 8/20
USPC .................................. 715/762, 243
See application file for complete search history.

(56) References Cited

U.S. PATENT DOCUMENTS

| 7,200,816 B2 * | 4/2007 | Falk et al. ...................... 715/762 |
| 8,307,331 B2 * | 11/2012 | Warila et al. .................. 717/109 |
| 2010/0146377 A1 * | 6/2010 | Simonyi ........................ 715/229 |

* cited by examiner

*Primary Examiner* — Omar Abdul-Ali
(74) *Attorney, Agent, or Firm* — Lowenstein Sandler LLP

(57) ABSTRACT

A system and method for generating a batch of one or more GUIs is disclosed. In one embodiment, the system comprises a definitions module, builder module, behavior module, style module and display module. The definitions module receives a definition input and generates a layout definition based on the definitions input. The builder module generates graphical data based on the layout definition. The behavior module generates a behavior definition from a behavior input and modifies the graphical data based on the behavior definition. The style module defines a style sheet based on a style input and modifies the graphical data based on the style sheet. In one embodiment, the behavior module and style module modify the graphical data by modifying the layout definition. The display module determines graphical data for generating one or more GUIs based on the layout definition, the behavior definition and the style sheet.

20 Claims, 6 Drawing Sheets

BATCH GRAPHICAL USER INTERFACE GENERATOR

BACKGROUND

The specification relates to a system for generating a batch of one or more graphical user interfaces ("GUIs"). In particular, the specification relates to a system for generating a batch of one or more GUIs using a template language.

User interfaces such as Graphical User Interfaces ("GUIs" if plural, "GUI" if singular) are a popular means for users to interact with electronic data. For example, GUIs enable users to search for, select and view video content online. There are many other uses for GUIs. For example, users sometimes use GUIs to compose, send and read e-mails.

With all these uses for GUIs, there is a need to generate more and more new GUIs. New applications and programs often utilize more than one GUI. Additionally, because interaction with multiple GUIs multiple times a day is a part of everyday life for many people customizing GUIs to suit the needs of a user can lead to a better user experience and enhanced user productivity.

Current systems for batch GUI generation have numerous problems. For example, current systems for generating GUIs require time consuming custom coding. This custom coding requires a human computer programmer to actually determine and manually enter custom code for each GUI. This process is laborious and not cost effective.

SUMMARY

The deficiencies and limitations of the prior art are overcome at least in part by providing a system and method for generating a batch of one or more GUIs. An interface generator module comprises a definitions module, builder module, behavior module, style module and display module. The definitions module generates a layout definition based at least in part on a definition input. In one embodiment, the layout definition is a graphical data tree, e.g., a sprite tree. The builder module generates graphical data based at least in part on the layout definition.

The behavior module generates a behavior definition based at least in part on a behavior input and modifies the graphical data based at least in part on the behavior definition. The style module defines a style sheet based at least in part on a style input and modifies the graphical data based at least in part on the style sheet. In one embodiment, the graphical data received and modified by one or more of the definitions module and style module is the layout definition. The display module determines graphical data for generating one or more GUIs based at least in part on the layout definition, the behavior definition and style sheet.

In one embodiment, one or more of the definition input, behavior input and style input comprise declarative code received from a user. In one embodiment, one or more of the definition input, behavior input and style input are included in a single user input.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
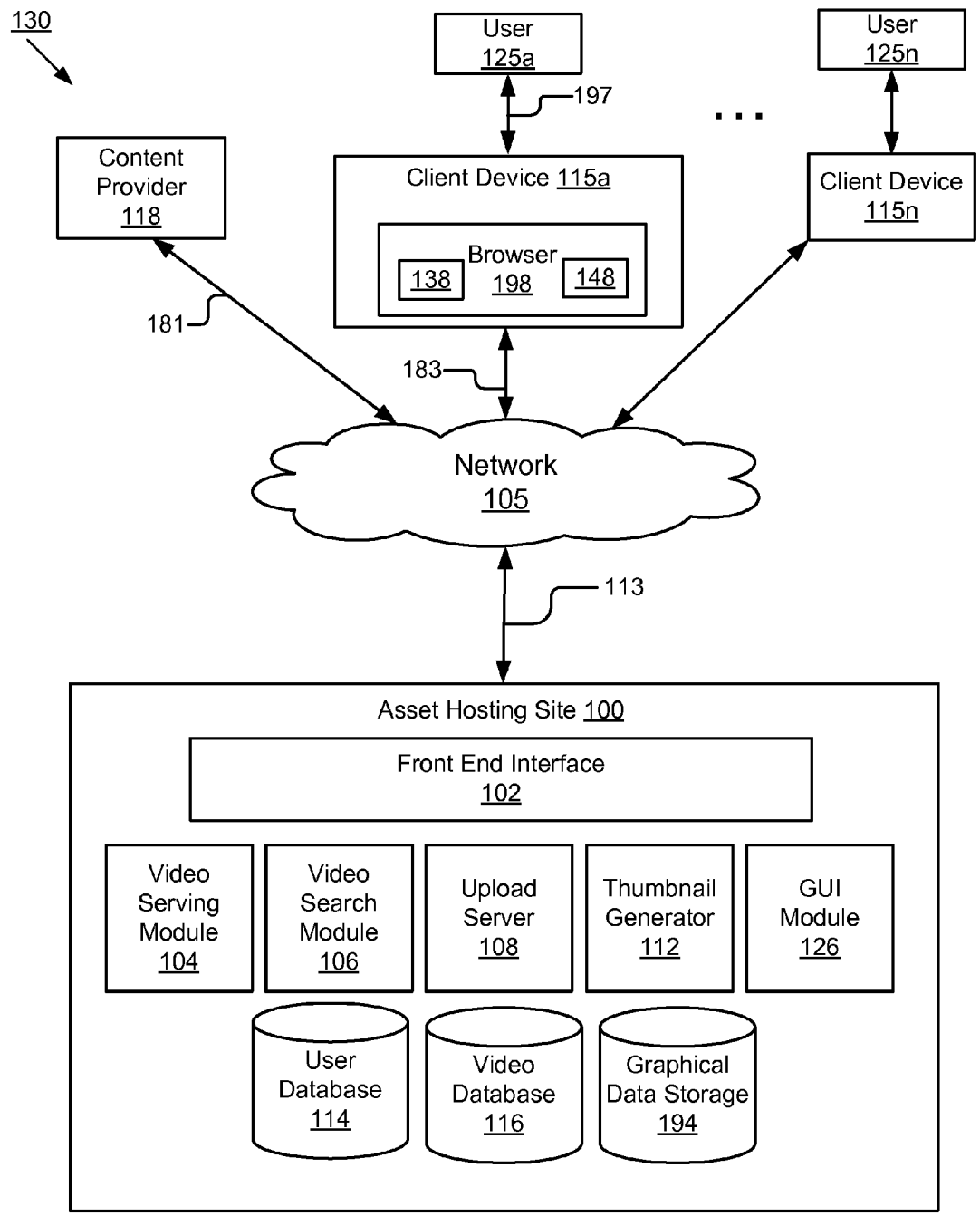
FIG. 1 is a high-level block diagram illustrating one embodiment of a system for generating a batch of one or more GUIs.

A system and method for generating a batch of one or more GUIs. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to GUIs and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable storage medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

Finally, embodiments described herein include collection of data describing a user and/or activities of users. In one embodiment, such data is only collected upon the user providing consent to the collection of this data. In some implementations, a user is prompted to explicitly allow data collection. Further, the user may opt-in or opt-out of participating in such data collection activities. In one embodiment, the collected data is anonymized prior to performing any analysis to obtain any statistical patterns so that the identity of the user cannot be determined from the collected data.

System Overview

FIG. 1 illustrates a block diagram of a system 130 for generating a batch of one or more GUIs. The illustrated embodiment of the system 130 includes client devices 115a, 115n (also referred to collectively or individually as client devices 115) that are accessed by users 125a, 125n (also referred to collectively or individually as users 125), a content provider 118 and an asset hosting site 100. In the illustrated embodiment, these entities are communicatively coupled via a network 105. For example, the asset hosting site 100, the content provider 118 and the client devices 115 are communicatively coupled to one another via a network 105 to facilitate sharing of information (e.g., video content file) between users 125 of client devices 115.

Although one content provider 118, two client devices 115, and one asset hosting site 100 are illustrated in FIG. 1, persons having ordinary skill in the art will recognize that any number of content providers 118, client devices 115 and asset hosting sites 100 can be communicatively coupled to the network 105. Furthermore, while one network 105 is coupled to the client devices 115, the content provider 118 and the asset hosting site 100, persons having ordinary skill in the art will appreciate that any number of networks 105 can be connected to the client devices 115, the content provider 118 and the asset hosting site 100.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc. In yet another embodiment, all or some of the links in the network 105 are encrypted using conventional encryption technologies such as secure sockets layer (SSL), secure HTTP and/or virtual private networks (VPNs).

In the illustrated embodiment, the content provider 118 is communicatively coupled to the network 105 via signal line 181. The client device 115a is coupled to the network 105 via signal line 183. The user 125a interacts with the client device 115a as represented by signal line 197. Client device 115n and user 125n are coupled and interact in a similar manner.

The asset hosting site 100 is communicatively coupled to the network 105 via signal line 113.

The asset hosting site 100 is any system that allows users to access video content via searching and/or browsing interfaces. An example of an asset hosting site 100 is the YOUTUBE™ website, found at www.youtube.com. Other video hosting sites are known as well, and are adapted to operate according to the teachings disclosed herein. It will be understood that the term "website" represents any computer system adapted to serve content using any internet working protocols, and is not intended to be limited to content uploaded or downloaded via the Internet or the HTTP protocol.

In one embodiment, sources of the video content on the asset hosting site 100 are from uploads of videos by users, searches or crawls of other websites or databases of videos, or the like, or any combination thereof. For example, in one embodiment, the asset hosting site 100 is configured to allow upload of video content by users 125 and/or content providers 118. In another embodiment, the asset hosting site 100 is configured to obtain videos from other sources by crawling such sources or searching such sources in real time.

To simplify and clarify the present description, the video content files received and shared by the asset hosting site 100 will be referred to as videos, video files, or video items. Persons having ordinary skill in the art will recognize that the asset hosting site 100 can receive and share content of any media type and file type. For example, the asset hosting site 100 shares a content file such as a video, an audio, a combination of video and audio, an image such as a JPEG or GIF file and/or a text file, etc.

The asset hosting site 100 is communicatively coupled to the network 105 via signal line 113. In the illustrated embodiment, the asset hosting site 100 includes: a front end interface 102; a video serving module 104; a video search module 106; an upload server 108; a thumbnail generator 112; a GUI module 126; a user database 114; a video database 116; and a graphical data storage 194. The components of the asset hosting site 100 are communicatively coupled to one another. Other conventional features, such as firewalls, load balancers, authentication servers, application servers, failover servers, site management tools, and so forth are not shown so as not to obscure the feature of the system.

In one embodiment, the illustrated components of the asset hosting site 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the asset hosting site 100 are performed by one or more client devices 115 and/or content providers 118 in other embodiments if appropriate. In one embodiment, the functionality attributed to a particular component is performed by different or multiple components operating together.

Each of the various servers and modules on the asset hosting site 100 is implemented as a server program executing on a server-class computer comprising one or more central processing units ("CPU," or "CPUs" if plural), memory, network interface, peripheral interfaces, and other well-known components. In one embodiment, the computers themselves run an open-source operating system such as LINUX, have one or more CPUs, 1 gigabyte or more of memory, and 100 gigabytes or more of disk storage. In one embodiment, other types of computers are used, and it is expected that as more powerful computers are developed in the future, they are configured in accordance with the teachings disclosed herein.

In another embodiment, the functionality implemented by any of the elements is provided from computer program products that are stored in one or more tangible, non-transitory computer-readable storage mediums (e.g., random access memory ("RAM"), flash, solid-state drive ("SSD"), hard disk drive, optical/magnetic media, etc.).

The front end interface 102 is an interface that handles communication with the content provider 118 and client devices 115 via the network 105. For example, the front end interface 102 receives video files uploaded from the content provider 118 and/or users 125 of the client devices 115 and delivers the video files to the upload server 108. In one embodiment, the front end interface 102 receives requests from users 125 of the client devices 115 and delivers the requests to the other components of the asset hosting site 100 (e.g., the video search module 106, the video serving module 104, etc.). For example, the front end interface 102 receives a video search query from a user 125 and sends the video search query to the video search module 106.

The upload server 108 receives video files from the content provider 118 and/or users 125 operating on client devices 115 via the front end interface 102. In one embodiment, the upload server 108 processes the video files and stores the video files in the video database 116. For example, the upload server 108 assigns a video identifier (video ID) to a video and stores the video and the video ID in the video database 116. Further examples of processing a video file by the upload server 108 include performing one or more of: formatting; compressing; metadata tagging; and content analysis, etc.

The video database 116 is a storage system that stores video files shared by the asset hosting site 100 with the users 125. In one embodiment, the video database 116 stores the video files processed by the upload server 108. In another embodiment, the video database 116 stores metadata of the video files. For example, the video database 116 stores one or more of: a title; a video ID; description; tag information; and administrative rights of a video file. The administrative rights of a video file include one or more of: the right to delete the video file; the right to edit information about the video file; and the right to associate the video file with an advertisement, etc.

In one embodiment, some or all of the metadata of a video file is provided by the content provider 118 and/or the user 125. For example, the content provider 118 and/or the user 125 provide a title and a short description of a video when uploading the video to the asset hosting site 100. In another embodiment, the content provider 118 and/or the user 125 also provide specification indicating whether a video file uploaded by the content provider 118 and/or the user 125 is private, for reference, or public. A private video file or a video file for reference is not viewable by others. In yet another embodiment, the content provider 118 and/or the user 125 includes a territorial limitation for each uploaded video file.

The video search module 106 is code and routines that, when executed by a processor (not pictured), processes any search queries received by the front end interface 102 from a user 125 using a client device 115. A search query from a user 125 includes search criteria such as keywords that, for example, identify videos the user 125 is interested in viewing. In one embodiment, the video search module 106 uses the search criteria to query the metadata of video files stored in the video database 116. The video search module 106 returns the search results to the client device 115 via the front end interface 102. For example, if a user 125 provides a keyword search query to the video search module 106 via the front end interface 102, the video search module 106 identifies videos stored in the video database 116 matching the keyword and returns search results (e.g., video IDs, titles, descriptions, thumbnails of the identified videos) to the user 125 via the front end interface 102.

The video serving module 104 is code and routines that, when executed by a processor (not pictured), processes requests for videos and serves videos to client devices 115. For example, the video serving module 104 receives a request for viewing a video from a user 125 of the client device 115, retrieves the video from the video database 116 based at least in part on the request and presents the video to the client device 115 via the front end interface 102.

In one embodiment, the video serving module 104 receives a request from a client device 115 to access a video when the user 125 clicks on a link to the video. The request received from the client device 115 includes the video ID of the video. In one embodiment, the video ID is included automatically in the request once the user 125 clicks on the link for the video. The video serving module 104 uses the video ID to search and locate the video in the video database 116. Once the requested video is located, the video serving module 104 sends the video to the client device 115 via the front end interface 102. In one embodiment, the video is presented to the user 125 on a web browser stored and executed by the client device 115. Metadata associated with the video such as the title and description of the video is also presented to the user 125. In one embodiment, the video serving module 104 stores the video ID of the video in the user database 114 after sending the video to the client device 115 so that a video viewing history of the user 125 is stored in the user database 114.

The user database 114 is a storage system that stores data and/or information associated with any user. For example, the user database 114 stores video IDs of video files uploaded by a user 125 so that a video uploading history of the user 125 is maintained in the user database 114. The user database 114 also stores video IDs of video files that the user 125 has accessed from the video database 116 for viewing so that a video viewing history for the user 125 is stored in the user database 114. In one embodiment, the user 125 is identified by using a unique user name and password and/or by using the user's 125n internet protocol address.

The thumbnail generator 112 is code and routines that, when executed by a processor (not pictured), generates a thumbnail for a video. A thumbnail is an image that represents a video on the asset hosting site 100. For example, the thumbnail generator 112 analyzes the video and selects a frame from the video as the thumbnail. In one embodiment, the thumbnail generator 112 provides one or more images for the video and allows a publisher (e.g., a content provider 118 or a user 125 uploading the video using a client device 115) to select one image as the thumbnail.

The graphical data storage 194 is a storage system that stores graphical code for generating GUIs for display to the user 125 in the browser 198 of the client device 115. For example, the graphical data storage 194 stores graphical data for displaying a screen on a display of the client device 115 that allows the user 125 to request to view a video.

The GUI module 126 is code and routines that, when executed by a processor (not pictured), generates a GUI that displays information to a user and/or allows a user to input information via the GUI. In one embodiment, the GUI module 126 provides the functionality described below for receiving inputs from users 125 and/or displaying information to users 125. The GUI module 126 is communicatively coupled to the front end interface 102. The GUI module 126 retrieves graphical data from the graphical data storage 194 and transmits the graphical data to the front end interface 102. The front end interface 102 communicates with the network 105 to transmit the graphical data to a processor-based computing device communicatively coupled to the network 105.

For example, the front end interface 102 transmits the graphical data to one or more of the content provider 118 and client device 115. One or more of the content provider 118 and the client device 115 receives the graphical data and generates a GUI displayed on a display device (e.g., a monitor) communicatively coupled to the content provider 118 and/or the client device 115. The GUI is displayed on a display device and viewed by a human user (e.g., a user such as user 125). The GUI includes one or more fields, drop down boxes or other conventional graphics used by the human user to provide inputs that are then transmitted to the asset hosting site 100 via the network 105. Data inputted into the GUI is received by the front end interface 102 and stored in one or more the video database 116, user database 114 and the user activity storage 192.

In one embodiment, the GUI module 126 retrieves an uploaded content file (such as a user generated video clip) and generates a web page that includes a playable version of the uploaded content file. For example, the web page includes an embedded media player playing uploaded content file to a user 125. In one embodiment, the web page also includes description (e.g., a title, an upload entity, a date of uploading, the number of views, etc.) for the uploaded content file. The GUI module 126 transmits the web page to the front end interface 102. The front end interface 102 communicates with the network 105 to transmit the web page to one or more of the client device 115 and the content provider 118 for displaying the web page on a display device communicatively coupled to one or more of the client device 115 and the content provider 118.

The client device 115 is any computing device. For example, the client device 115 is a personal computer ("PC"), smart phone, tablet computer (or tablet PC), etc. One having ordinary skill in the art will recognize that other types of client devices 115 are possible. In one embodiment, the system 130 comprises a combination of different types of client devices 115. For example, a plurality of other client devices 115 is any combination of a personal computer, a smart phone and a tablet computer.

The client device 115 comprises a browser 198. In one embodiment, the browser 198 is code and routines stored in a memory (not pictured) of the client device 115 and executed by a processor (not pictured) of the client device 115. For example, the browser 198 is a browser application such as Google Chrome. In one embodiment, the browser 198 comprises an interface generator module 138, which will be discussed further in reference to FIG. 2. While the interface generator module 138 is illustrated as part of the browser 198, a person having ordinary skill in the art will recognize that the interface generator module 138 could reside on a content server 118 or asset hosting site 100 and be accessed by a user 125 via the browser 198 of a client device 115. In one embodiment, the browser further comprises an application 148. In one embodiment, the application 148 is an embedded media player for displaying video content to the user 125. Although a browser 198, interface generator module 138 and application 148 are shown in reference to client device 115a, a person having ordinary skill in the art will recognize that any client device 115 may comprise these elements. The user 125 is a human user of the client device 115.

Interface Generator Module 138

Figure 2:
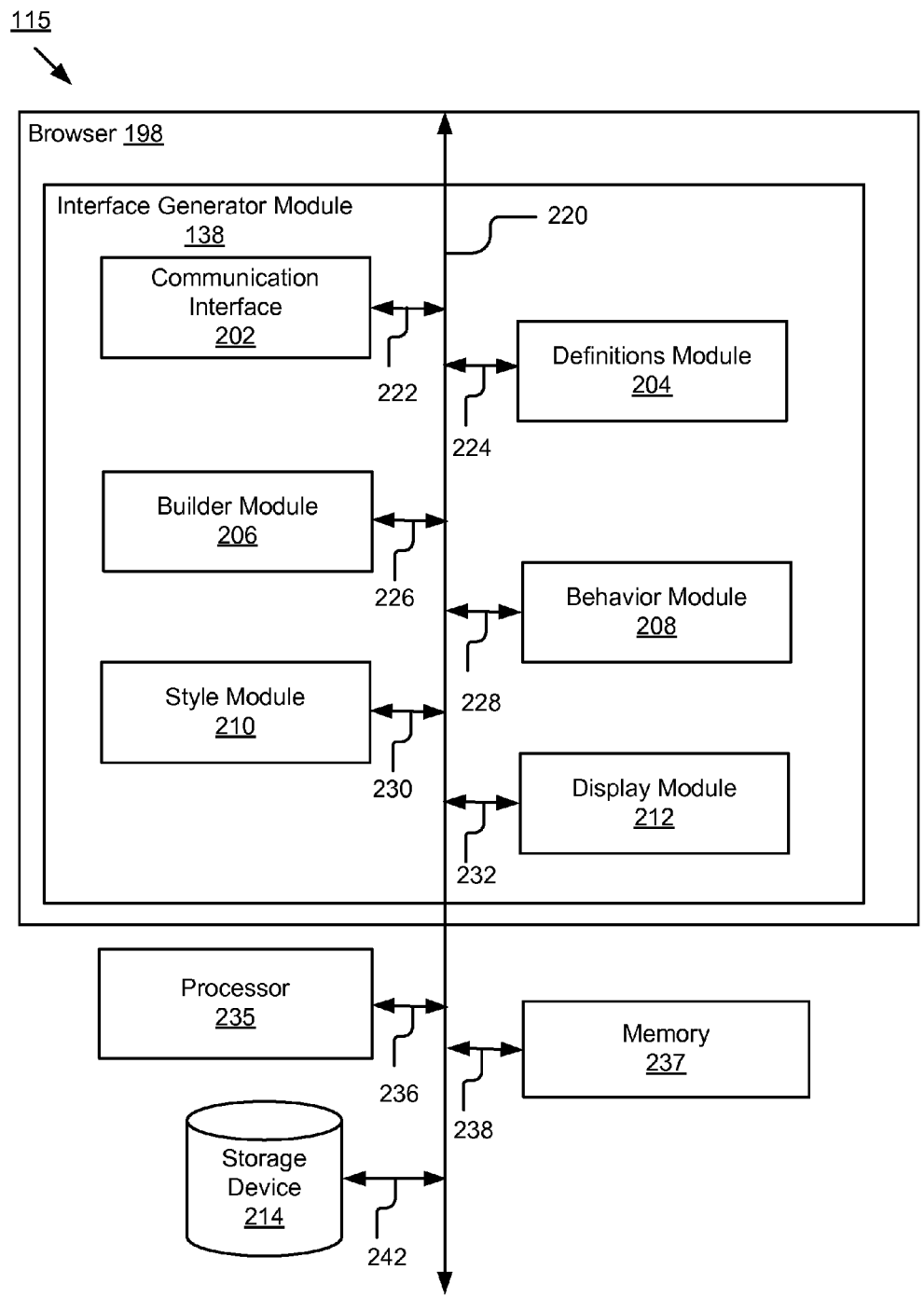
FIG. 2 is a block diagram illustrating one embodiment of a client device where an interface generator module is illustrated in detail.

Referring now to FIG. 2, depicted is an embodiment of a client device 115 showing the interface generator module 138 in more detail. Specifically, FIG. 2 depicts a processor 235, a memory 237, a storage device 214 and a browser 198 including the interface generator module 138.

In one embodiment, the processor 235 is a computer processor of the client device 115, and can be used to execute code and routines. The processor 235 comprises an arithmetic logic unit, a microprocessor, a general purpose controller or some other processor array to perform computations and execute code and routines. The processor 235 is coupled to the bus 220 for communication with the other components of the client device 115. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 236.

The memory 237 is a non-transitory storage medium. The memory 237 stores instructions and/or data that may be executed by the processor 235. For example, in one embodiment, the memory 237 stores the interface generator module 138. The memory 237 is communicatively coupled to the bus 220 for communication with the other components of the client device 115. In one embodiment, the instructions and/or data stored on the memory 237 comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. The memory 237 is communicatively coupled to the bus 220 via signal line 238. In one embodiment, the memory 237 stores the interface generator module 138 and the sub-modules 202, 204, 206, 208, 210 and 212 that are included in the interface generator module 138.

The storage device 214 is a non-transitory memory that stores data generated and/or received by the interface generator module 138 or its sub-modules and other data necessary to perform the functionality described below.

In one embodiment, the interface generator module 138 comprises a communication interface 202, a definitions module 204, a builder module 206, a behavior module 208, a style module 210 and a display module 212.

The communication interface 202 includes code and routines for handling communications between the definitions module 204, the builder module 206, the behavior module 208, the style module 210, the display module 212 and the other components of the client device 115. In one embodiment, the communication interface 202 is a set of instructions executable by the processor 235. In another embodiment, the communication interface 202 is stored in the memory 237 and is accessible and executable by the processor 235. In either embodiment, the communication interface 202 is adapted for cooperation and communication with the processor 235 and other components of the client device 115 via signal line 222.

The communication interface 202 is communicatively coupled to the bus 220 via signal line 222.

The communication interface 202 handles communications between the definitions module 204, the builder module 206, the behavior module 208, the style module 210, the display module 212 and the other components of the client device 115. For example, the communication interface 202 communicates with the definitions module 204 and the builder module 206 to pass the output of the definitions module 204 (a layout definition) to the builder module 206. However, this description may occasionally omit mention of the communication interface 202 for purposes of clarity and convenience. For example, for purposes of clarity and convenience, the above scenario may be described as the definitions module 204 passing a layout definition to the builder module 206.

The definitions module 204 includes code and routines for generating a layout definition based at least in part on user input including data for generating a layout definition. This user input is referred to herein as a "definition input." In one embodiment, the definitions module 204 is a set of instructions executable by the processor 235 to provide the functionality described below for generating a layout definition based at least in part on a definition input. In another embodiment, the definitions module 204 is stored in the memory 237 and is accessible and executable by the processor 235. In either embodiment, the definitions module 204 is adapted for cooperation and communication with the processor 235 and other components of the client device 115 via signal line 224. The definitions module 204 is communicatively coupled to the bus 220 via signal line 224.

The definitions module 204 generates a layout definition based at least in part on one or more definition inputs. In one embodiment, the definition input is in the form of a template language. In one embodiment, the definition input comprises declarative code allowing the user 125 to name and optionally nest graphical elements in an interface, thereby beneficially enabling the user 125 to generate one or more layout definitions for one or more GUIs.

In one embodiment, the layout definition is a graphical data tree. The definition module 204 generates a graphical data tree based at least in part on the declarative code included in the definition input. In one embodiment, the tree includes more than one node. In one embodiment, a node includes one or more definitions described by the declarative code. For example, the definition module 204 includes a parser that parses a definition from the declarative code included in the definition input. The definition module 204 builds a graphical data tree by arranging the definitions into nodes.

In one embodiment, a node can be nested inside of another node of the graphical data tree. For example, a first node on the tree defines a vertical layout for a GUI. Nested inside the first node are a second node and a third node that define the horizontal layout for the GUI. Nested inside the second node is a forth node that defines a graphical representation for a button (e.g., a play button on a media player). Nested inside the third node is a fifth node that defines a graphical representation of a seek bar. Thus, in this example multiple nodes can be nested inside the nodes of a graphical data tree. Persons having skill in the art will recognize other examples for having a node nested inside another node of the graphical tree.

A graphical data tree is any tree that organizes graphical data. For example, the graphical data tree is a sprite tree. A sprite tree is a tree organizing one or more sprites. A sprite is a form of graphical data known to those having skill in the art. In one embodiment, one or more of the sprites that comprise the sprite tree contain one or more sprites, which may themselves contain additional sprites. In one embodiment, a sprite is graphical data that defines how a graphical element of a GUI should appear when generated by a browser. For example, the sprite includes graphical data for causing a processor to display a two-dimensional image or animation that is integrated into a larger scene. In one embodiment, a graphical element of a GUI is defined by one or more sprites. For example, a graphical button (referred to herein as a "button") is a graphical element of a GUI and may comprise one or more sprites. In one embodiment, a node of a sprite tree includes one or more sprites that may themselves include additional sprites nested inside of them.

In one embodiment, the layout definition is stored by the definitions engine 204 (or the communication interface 202) in the storage device 214 of the client device 115 (or any other non-transitory storage medium communicatively accessible by the definitions engine 204).

In one embodiment, the definition input includes a layout definition. For example, the definition input includes a graphical data tree. The definitions module 204 determines that the definition input includes the layout definition. Based at least in part on this determination, the definitions module 204 does not generate a new layout definition and instead determines that the layout definition is the definition included in the definition input.

In one embodiment, the definitions module 204 passes the layout definition to the builder module 206. For example, the definitions engine 204 is communicatively coupled to the builder module 206 to send the layout definition to the builder module 206. In another embodiment, the definitions module 204 stores the layout definition in the storage device 214 (or any other non-transitory storage medium). Other modules of the interface generator module 138 can retrieve and optionally modify the layout definition by accessing the storage device 214 (or other non-transitory storage medium).

The builder module 206 includes code and routines for generating graphical data for generating a GUI based at least in part on the layout definition. In one embodiment, the builder module 206 is a set of instructions executable by the processor 235 to provide the functionality described below for generating a GUI based at least in part on the layout definition. In another embodiment, the builder module 206 is stored in the memory 237 and is accessible and executable by the processor 235. In either embodiment, the builder module 206 is adapted for cooperation and communication with the processor 235 and other components of the client device 115 via signal line 226. The builder module 206 is communicatively coupled to the bus 220 via signal line 226.

The builder module 206 generates graphical data for generating a GUI based at least in part on the layout definition. For example, the builder module 206 receives a layout definition (i.e., a graphical data tree) from the definitions module 204. The builder module 206 parses the nodes of the graphical data tree and generates the graphical data for generating the GUI based at least in part on the definitions included at the nodes of the graphical data tree. For example, the builder module 206 generates a GUI containing a scroll bar and a play button. The builder module 206 generates the GUI containing the scroll bar and the play button by parsing the sprite tree and generating graphical elements for the GUI based at least in part on the definitions included in the nodes of the graphical data tree. The scroll bar and the play button are graphical elements of the GUI. Persons having skill in the art will recognize that the scroll bar and the play button are examples of graphical elements that can be generated by the builder module 206 parsing the sprite tree, and that builder module 206 can generate other graphical elements by parsing the sprite tree.

In one embodiment, the layout definition (e.g., the graphical data tree) is optionally modified by the behavior module 206, the style module 208 or both, and the builder module 206 generates graphical data based at least in part on that optionally modified layout definition.

In one embodiment, the graphical data for generating the GUI is stored in the storage device 214 (or any other non-transitory storage medium). Other modules of the interface generator module 138 can retrieve and optionally modify the graphical data by accessing the storage device 214 or other non-transitory storage medium.

The behavior module 208 includes code and routines for generating a behavior definition. A behavior definition includes code and routines that describe how one or more graphical elements of the GUI generated based on the layout definition behave. For example, assume that the graphical element is a button. Further assume that the button is supposed to change in appearance when a user mouses over the button. The behavior definition is data that defines how the appearance of the button changes when a user mouses over the button.

In one embodiment, the behavior module 208 includes a set of instructions executable by the processor 235 to provide the functionality described below for generating a behavior definition. In another embodiment, the behavior module 208 is stored in the memory 237 and is accessible and executable by the processor 235. In either embodiment, the behavior module 208 is adapted for cooperation and communication with the processor 235 and other components of the client device 115 via signal line 228. The behavior module 208 is communicatively coupled to the bus 220 via signal line 228.

In one embodiment, the behavior module 208 generates a behavior definition based at least in part on a user input (e.g., a user input from an administrator). This user input is referred to herein as a "behavior input." For example, the behavior definition defines that the play button in the GUI appears upon mouse over. In this example the appearance of the play button upon mouse over is the behavior defined by the behavior definition. A person having ordinary skill in the art will recognize that other behaviors are possible.

In one embodiment, the behavior module 208 modifies the graphical data for the GUI based at least in part on the behavior definition. For example, the behavior module 208 accesses the storage device 214, retrieves the graphical data for generating the GUI generated by the builder module 206 and modifies the graphical data based at least in part on the behavior definition. In one embodiment, the behavior module 208 modifies the graphical data by modifying the layout definition based at least in part on the behavior definition. For example, the behavior module 208 accesses the storage device 214, retrieves the layout definition stored by the definitions module 204 and modifies the layout definition by attaching the behavior definition to one or more nodes of the graphical data tree.

The output of the behavior module 208 is referred to herein as the "modified graphical data." In one embodiment, the modified graphical data is stored in the storage device 214 (or any other non-transitory storage medium) by the behavior module 208. In another embodiment, the behavior module 208 transmits the modified graphical data to the style module 210.

The style module 210 includes code and routines for defining a style sheet based at least in part on a user input (e.g., a user input from an administrator). This user input is referred to herein as a "style input." In one embodiment, the style module 210 is a set of instructions executable by the processor 235 to provide the functionality described below for defining a style sheet based at least in part on the style input. In another embodiment, the style module 210 is stored in the memory 237 and is accessible and executable by the processor 235. In either embodiment, the style module 210 is adapted for cooperation and communication with the processor 235 and other components of the client device 115 via signal line 230. The style module 210 is communicatively coupled to the bus 220 via signal line 230.

The style module 212 defines a style sheet based at least in part on the style input. A style sheet is data that defines one or more visual properties of one or more graphical elements of the GUI defined by the modified graphical data. For example, the style sheet defines the size, color, pattern, texture, transparency, etc. of one or more graphical elements of the GUI defined by the modified graphical data. A person having ordinary skill in the art will recognize that other visual properties exist and may be defined by the style sheet.

In one embodiment, the style module 210 modifies the modified graphical data for the GUI based at least in part on the style sheet. For example, the style module 210 accesses the storage device 214, retrieves the modified graphical data for generating the GUI and modifies the modified graphical data based at least in part on the style sheet. In one embodiment, the style module 210 modifies the modified graphical data by modifying the layout definition based at least in part on the style sheet. For example, a graphical data tree is generated by the definitions engine 204 to generate the layout of one or more graphical elements of an interface, and the style module 212 modifies the graphical data tree to define, or re-define, one or more visual properties of the one or more graphical elements. A person having ordinary skill in the art will recognize that the style sheet may be applied before or after the behavioral definition.

In one embodiment, the data included in one or more of the behavior input, the style input and the definition input are included in a single user input. Such a user input is referred to herein as a "compound user input." For example, a compound user input includes data describing one or more layout definitions, one or more behaviors for one or more graphical elements and one or more style sheets for one or more graphical elements.

The output of the style module 210 is referred to herein as the "stylized graphical data." In one embodiment, the stylized graphical data is stored in the storage device 214 (or any other non-transitory storage medium) by the style module 210. In another embodiment, the behavior module 208 transmits the stylized graphical data to the display module 212.

The display module 212 includes code and routines for sending the stylized graphical data to the application 148 for display by the browser 198. In one embodiment, the display module 212 is a set of instructions executable by the processor 235 to provide the functionality described below for sending the stylized graphical data for display by the browser 198. In another embodiment, the display module 212 is stored in the memory 237 and is accessible and executable by the processor 235. In either embodiment, the display module 212 is adapted for cooperation and communication with the processor 235 and other components of the client device 115 via signal line 232. The style module 210 is communicatively coupled to the bus 220 via signal line 232.

The display module 212 sends the stylized graphical data to the application 148 for display in the browser 198 of the client device 115.

In one embodiment, the display module 212 retrieves the stylized graphical data from the storage device 214 and sends the stylized graphical data to the application 148. In another embodiment, the display module 214 sends the stylized graphical data to the graphical data storage 194 of the asset hosting site 100. The browser 198 and/or the application 148 takes steps to generate the GUI based at least in part on the stylized graphical data. In one embodiment, the stylized graphical data includes data for generating any number of GUIs. For example, the stylized graphical data includes data for generating hundreds or thousands of GUIs. Accordingly, persons having ordinary skill in the art will appreciate that in one embodiment the stylized graphical data is used to generate a batch of one or more GUIs. In one embodiment, the batch of one or more GUIs comprises one or more skins. A skin is a custom graphical appearance achieved by using a GUI and can be applied to a software application or a website. In one embodiment, a skin customizes the graphical elements of a GUI to suit the purpose, topic or taste of a user. For example, in one embodiment, the skin customizes the GUI of a website to display a user selected color as the background. A person having ordinary skill in the art will recognize other skins are possible.

Methods

Figure 3:
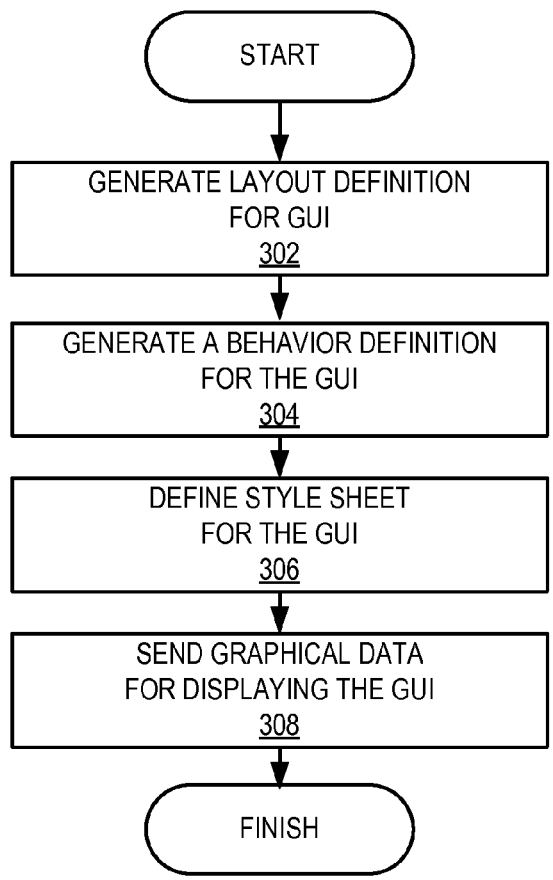
FIG. 3 is a flow diagram of one embodiment of a method for generating a batch of one or more GUIs.
Figure 4:
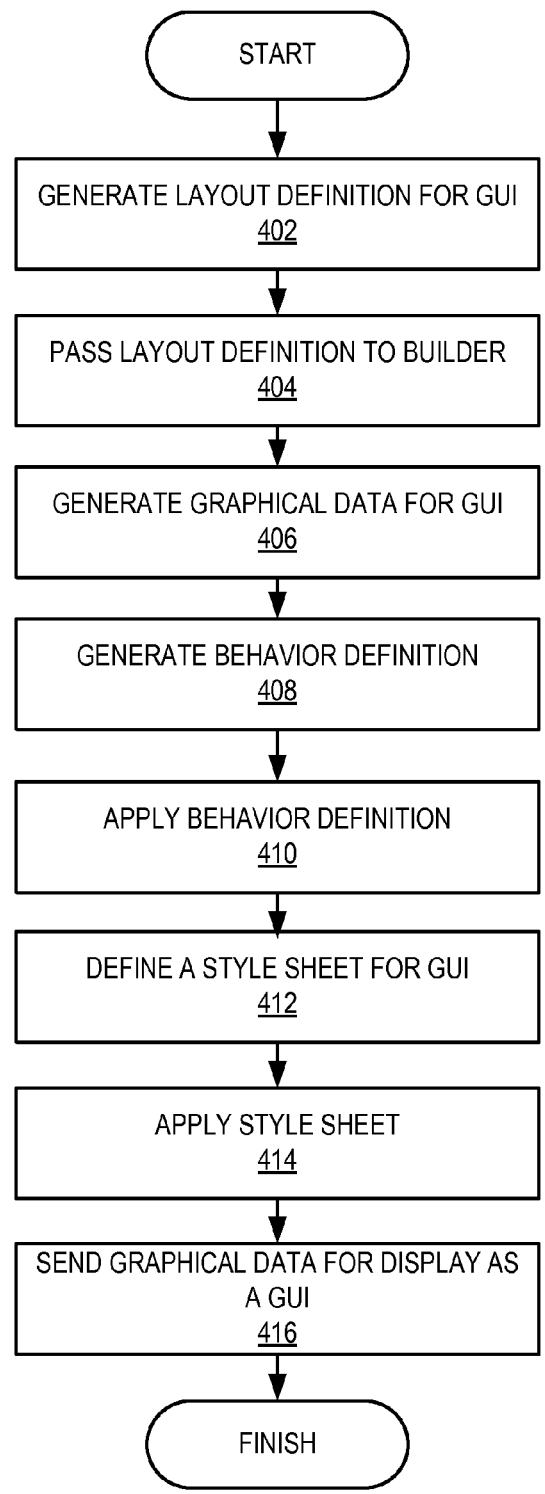
FIG. 4 is a flow diagram of one embodiment of another method for generating a batch of one or more GUIs.

FIGS. 3-4 depict various methods 300 and 400 performed by the system described above with reference to FIGS. 1-2.

FIG. 3 is a flow diagram depicting one embodiment of a method 300 for generating a batch of one or more GUIs. At step 302, the definitions module 204 generates a layout definition based at least in part on one or more definition inputs. At step 304, the behavior module 208 generates a behavior definition based at least in part on a behavior input. At step 306, the style module 210 defines a style sheet based at least in part on a style input. At step 308, the display module 212 sends graphical data generated by the builder module 204 and based at least in part on one or more of the layout definition, behavior definition and style sheet to the application 148 for displaying the GUI in the browser 198 of the client device 115.

FIG. 4 is a flow diagram depicting one embodiment of another method 400 for generating a batch of one or more GUIs. At step 402, the definitions module 204 generates a layout definition based at least in part on a definition input. At step 404, the communication interface 202 passes the layout definition to the builder module 206. At step 406, the builder module 206 generates graphical data for generating a GUI based at least in part on the layout definition.

At step 408, the behavior module 208 generates a behavior definition based at least in part on a behavior input. At step 410, the behavior module 208 applies the behavior definition by modifying the graphical data based at least in part on the behavior definition to generate modified graphical data. At step 412, the style module 212 defines a style sheet based at least in part on a style input. At step 414, the style module 212 applies the style sheet by making modifications based at least in part on the style sheet to the modified data to generate stylized graphical data. At step 416, the display module 414 sends the stylized graphical data for displaying the GUI to the client device 115.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

Graphical User Interfaces

Figure 5A:
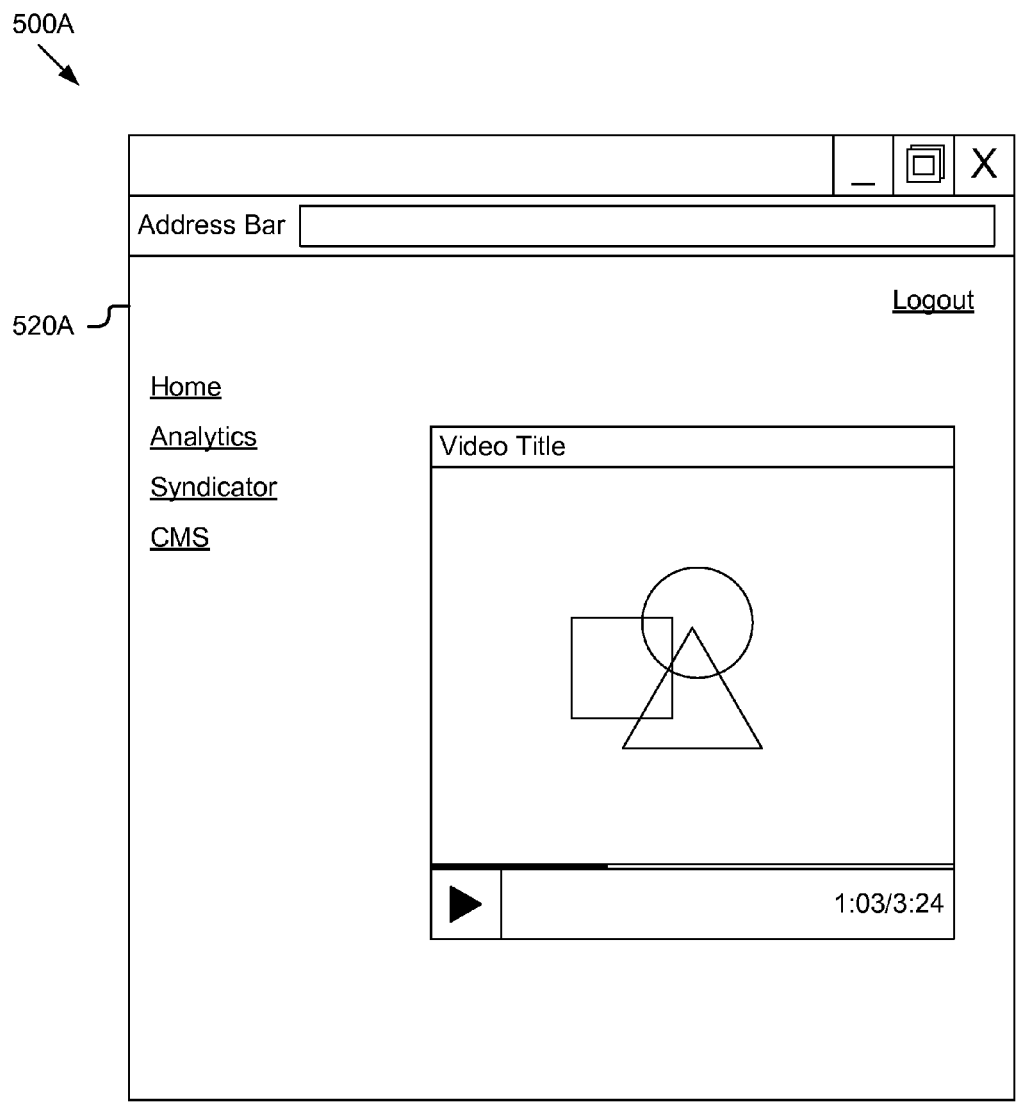
FIG. 5A is a graphic representation of a GUI displaying a website having a default skin.
Figure 5B:
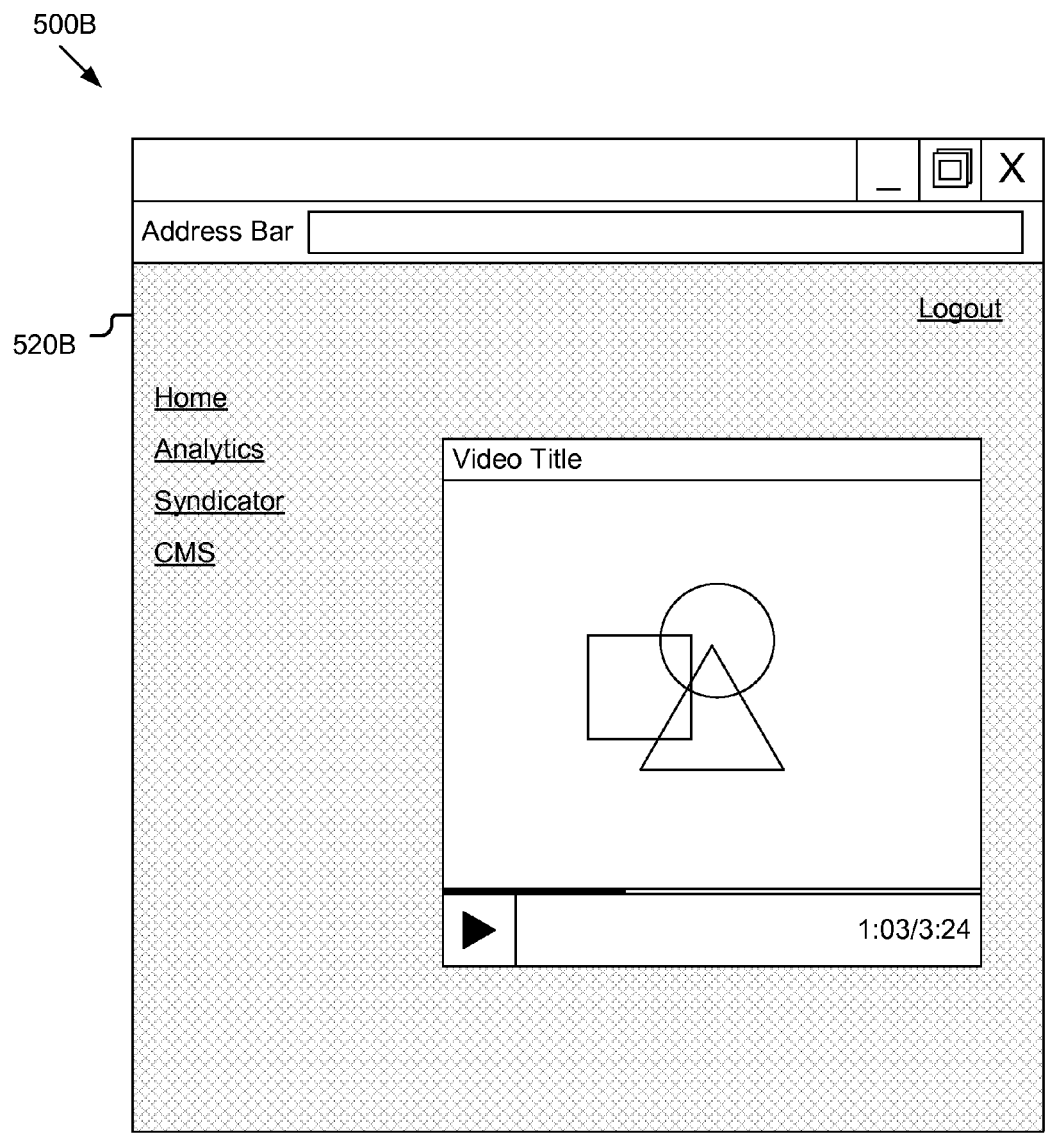
FIG. 5B is a graphic representation of a GUI displaying a website having a custom skin generated using the disclosed system and method for generating a batch of one or more GUIs.

FIG. 5A is a diagram illustrating an example of a GUI 500A displaying a website with a default skin 520A. FIG. 5B is a diagram illustrating an example of a GUI 500B displaying the same website with a custom skin 520B generated using the disclosed system and method for generating a batch of one or more GUIs. As illustrated, the custom skin 520B alters the graphical appearance of the website to give the website a patterned background. A person having ordinary skill in the art will recognize that other batches of one or more GUIs may be generated including one or more different skins.

What is claimed is:

1. A method comprising:
generating a layout definition based at least in part on a definition input, wherein the layout definition is a graphical data tree and the definition input is a template language;
generating a behavior definition based at least in part on a behavior input, the behavior definition to describe how an element of one or more graphical user interfaces ("GUIs") generated based on the layout definition behave;
defining a style sheet based at least in part on a style input, the style sheet to describe a visual property of the element; and
determining graphical data to generate the one or more GUIs based at least in part on the layout definition, the behavior definition and the style sheet.

2. The method of claim 1, wherein one or more of the definition input, the behavior input and the style input are a user input based at least in part on declarative code.

3. The method of claim 1, wherein generating a behavior definition modifies the layout definition based at least in part on the behavior definition.

4. The method of claim 1, wherein defining a style sheet comprises modifying the layout definition based at least in part on the style sheet.

5. The method of claim 1, wherein the graphical data tree describes one or more two dimensional graphics included in the one or more GUIs.

6. The method of claim 1, wherein the layout definition is a sprite tree.

7. The method of claim 1, wherein one or more of the definition input, behavior input and style input are included in a single user input.

8. The method of claim 1, wherein the one or more GUIs comprises one or more skins.

9. A computer program product comprising a non-transitory computer readable medium encoding instructions that, in response to execution by a computing device, cause the computing device to perform operations comprising:
generate a layout definition based at least in part on a definition input, wherein the layout definition is a graphical data tree and the definition input is a template language;
generate a behavior definition based at least in part on a behavior input, the behavior definition to describe how an element of one or more graphical user interfaces ("GUIs") generated based on the layout definition behave;
define a style sheet based at least in part on a style input, the style sheet to describe a visual property of the element; and
determine graphical data to generate the one or more GUIs based at least in part on the layout definition, the behavior definition and the style sheet.

10. The computer program product of claim 9, wherein one or more of the definition input, the behavior input based at least in part on declarative code.

11. The computer program product of claim 9, wherein the instructions for generating a behavior definition comprises instructions to modify the layout definition based at least in part on the behavior definition.

12. The computer program product of claim 9, wherein the instructions for defining a style sheet comprises instructions to modify the layout definition based at least in part on the style sheet.

13. The computer program product of claim 9, wherein the layout definition is a graphical data tree.

14. The computer program product of claim 9, wherein the layout definition is a sprite tree.

15. The computer program product of claim 9, wherein one or more of the definition input, behavior input and style input are included in a single user input.

16. The computer program product of claim 9, wherein the one or more GUIs comprises one or more skins.

17. A system comprising:
a memory; and
a processor coupled to the memory, the processor device to:
generate a layout definition based at least in part on a definition input;
generate graphical data based at least in part on the layout definition;
generate a behavior definition based at least in part on a behavior input;
define a style sheet based at least in part on a style input; and
determine the graphical data to generate one or more graphical user interfaces ("GUIs") based at least in part on the layout definition, the behavior definition and the style sheet.

18. The system of claim 17, wherein the layout definition is a sprite tree.

19. The system of claim 17, wherein one or more of the definition input, behavior input and style input are included in a single user input.

20. The system of claim 17, wherein the one or more GUIs comprises one or more skins.

\* \* \* \* \*